(12) United States Patent
Li et al.

(10) Patent No.: US 12,449,668 B2
(45) Date of Patent: Oct. 21, 2025

(54) HEAD-MOUNTED DISPLAY DEVICE AND CONTROL METHOD THEREOF, COMPUTER-READABLE STORAGE MEDIUM

(71) Applicant: Beijing Zitiao Network Technology Co., Ltd., Beijing (CN)

(72) Inventors: Xiaokai Li, Beijing (CN); Xin Li, Beijing (CN); Shuai Dong, Beijing (CN); Yao Tian, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/666,285

(22) Filed: May 16, 2024

(65) Prior Publication Data
US 2024/0385458 A1    Nov. 21, 2024

(30) Foreign Application Priority Data

May 16, 2023 (CN) .......................... 202310551540.8

(51) Int. Cl.
*G02B 27/01* (2006.01)
*G02B 27/00* (2006.01)
*G06F 3/01* (2006.01)

(52) U.S. Cl.
CPC ..... *G02B 27/0179* (2013.01); *G02B 27/0093* (2013.01); *G02B 27/0176* (2013.01); *G06F 3/013* (2013.01); *G02B 2027/0154* (2013.01); *G02B 2027/0187* (2013.01)

(58) Field of Classification Search
None
See application file for complete search history.

(56) References Cited

U.S. PATENT DOCUMENTS

| 11,042,039 B1* | 6/2021 | Trail ....................... G06F 3/013 |
| 2017/0160518 A1* | 6/2017 | Lanman ............. G02B 27/0093 |
| 2021/0173474 A1* | 6/2021 | Sztuk ...................... G06F 3/013 |

FOREIGN PATENT DOCUMENTS

| CN | 105892634 A | 8/2016 |
| CN | 108632599 A | 10/2018 |

* cited by examiner

*Primary Examiner* — Krishna P Neupane (57) ABSTRACT

A head-mounted display device and a control method thereof, and a computer-readable storage medium are provided. The head-mounted display device includes a display screen and a lens component, and the control method of the head-mounted display device includes: determining gaze directions of both eyes of a user; determining a gaze focus according to the gaze directions of the both eyes; and adjusting positions of the display screen and the lens component according to the gaze focus, so that the gaze focus is located at an image plane position of a virtual image formed by the lens component from an image displayed by the display screen.

11 Claims, 6 Drawing Sheets

HEAD-MOUNTED DISPLAY DEVICE AND CONTROL METHOD THEREOF, COMPUTER-READABLE STORAGE MEDIUM

CROSS-REFERENCE TO RELATED APPLICATION

The present application claims priority to Chinese Patent Application No. 2023105515408, filed on May 16, 2023, the disclosure of which is incorporated herein in its entirety as part of the present application.

TECHNICAL FIELD

The present disclosure relates to a head-mounted display device and a control method thereof, and a computer-readable storage medium.

BACKGROUND

Virtual Reality (VR) display technology is becoming increasingly integrated in people's everyday life as it forms a three-dimensional visual effect by using parallax by displaying two-dimensional images of different angles of the same object respectively in front of both eyes of the user.

SUMMARY

Embodiments of the present disclosure provide a head-mounted display device and a control method thereof, and a computer-readable storage medium.

An embodiment of the present disclosure provides a control method of a head-mounted display device, the head-mounted display device includes a display screen and a lens component, the control method of the head-mounted display device includes: determining gaze directions of both eyes of a user; determining a gaze focus according to the gaze directions of the both eyes; and adjusting positions of the display screen and the lens component according to the gaze focus, so that the gaze focus is located at an image plane position of a virtual image formed by the lens component from an image displayed by the display screen.

For example, according to an embodiment of the present disclosure, adjusting the positions of the display screen and the lens component according to the gaze focus includes adjusting the positions of the display screen and the lens component with respect to eyeballs of the both eyes, and/or adjusting a relative position of the display screen and the lens component, according to the gaze focus.

For example, according to an embodiment of the present disclosure, the head-mounted display device includes two display assemblies, the two display assemblies respectively correspond to eyeballs of the both eyes, and each display assembly includes at least one display screen and at least one lens component, the at least one lens component is located at a light exiting side of the at least one display screen; adjusting the positions of the display screen and the lens component according to the gaze focus includes adjusting a relative position of the display screen and the lens component, which includes: driving at least one of the display screen and the lens component in at least one display assembly to move in a direction parallel to an optical axis of the lens component to adjust a distance between the display screen and the lens component.

For example, according to an embodiment of the present disclosure, adjusting the positions of the display screen and the lens component with respect to the eyeballs of the both eyes includes: in a case where a line passing through the gaze focus and parallel to a direction of the optical axis passes through a region between the two display assemblies, driving the two display assemblies to move symmetrically in the plane with respect to a midpoint of a connecting line of the eyeballs of the both eyes.

For example, according to an embodiment of the present disclosure, adjusting the positions of the display screen and the lens component with respect to the eyeballs of the both eyes includes: in a case where a line passing through the gaze focus and parallel to a direction of the optical axis passes through one display assembly, driving the two display assemblies to move asymmetrically in the plane with respect to a midpoint of a connecting line of the eyeballs of the both eyes.

For example, according to an embodiment of the present disclosure, the head-mounted display device includes two display assemblies, the two display assemblies respectively correspond to eyeballs of the both eyes, and each display assembly includes at least one display screen and at least one lens component, the at least one lens component is located at a light exiting side of the at least one display screen; adjusting the positions of the display screen and the lens component according to the gaze focus includes adjusting a relative position of the display screen and the lens component, which includes: driving at least one of the display screen and the lens component in at least one display assembly to move in a direction parallel to an optical axis of the lens component to adjust a distance between the display screen and the lens component.

For example, according to an embodiment of the present disclosure, adjusting the relative position of the display screen and the lens component includes: in a case where a line passing through the gaze focus and parallel to a direction of the optical axis passes through a region between the two display assemblies, driving structures of a same type respectively from the two display assemblies to move by a same distance in the direction parallel to the optical axis of the lens component, and the structures including at least one of the display screen and the lens component.

For example, according to an embodiment of the present disclosure, adjusting the relative position of the display screen and the lens component includes: in a case where a line passing through the gaze focus and parallel to a direction of the optical axis passes through one display assembly, driving structures of a same type respectively from the two display assemblies to move by different distances in the direction parallel to the optical axis of the lens component, and the structures include at least one of the display screen and the lens component; or in a case where a line passing through the gaze focus and parallel to a direction of the optical axis passes through one display assembly, driving at least one of the display screen and the lens component in only one display assembly to move in the direction parallel to the optical axis of the lens component.

For example, according to an embodiment of the present disclosure, a movement time of adjusting the positions of the display screen and the lens component is within 100 milliseconds after a blink or an eye jump of the both eyes of the user.

For example, according to an embodiment of the present disclosure, after adjusting the gaze focus located in the image plane position of the virtual image, the control method further including: adjusting display content in the display screen to optimize an aberration of the virtual image.

An embodiment of the present disclosure provides a head-mounted display device including: a housing; two display assemblies, located in the housing, the two display assemblies respectively corresponding to eyeballs of both eyes of a user, and each display assembly including at least one display screen and at least one lens component located at a light exiting side of the at least one display screen; an eye tracker, located in the housing, the eye tracker being configured to determine gaze directions of the both eyes of the user and determine a gaze focus of the both eyes according to the gaze directions of the both eyes; a controller, located in the housing, the controller being electrically connected with the two display assemblies and the eye tracker. The two display assemblies are configured to be movable with respect to the housing, and the controller is configured to adjust positions of the display screen and the lens component according to the gaze focus, so that the gaze focus is located at an image plane position of a virtual image formed by the lens component from an image displayed by the display screen.

For example, according to an embodiment of the present disclosure, the controller is configured to adjust the positions of the display screen and the lens component with respect to the eyeballs of the both eyes, and/or adjust a relative position of the display screen and the lens component, according to the gaze focus.

For example, according to an embodiment of the present disclosure, at least one display assembly is configured to move in a plane to adjust a position of the at least one display assembly relative to a corresponding eyeball, and the plane is a plane perpendicular to an optical axis of the lens component.

For example, according to an embodiment of the present disclosure, the two display assemblies are configured to move symmetrically or asymmetrically in the plane with respect to a midpoint of a connecting line of the eyeballs of the both eyes.

For example, according to an embodiment of the present disclosure, at least one of the display screen and the lens component in at least one display assembly is configured to move in a direction parallel to an optical axis of the lens component to adjust a distance between the display screen and the lens component.

For example, according to an embodiment of the present disclosure, structures of a same type respectively from the two display assemblies are configured to move a same distance or different distances in the direction parallel to the optical axis of the lens component according to the gaze focus, and the structures include at least one of the display screen and the lens component; or at least one of the display screen and the lens component in only one display assembly in the two display assemblies is configured to move in the direction parallel to the optical axis of the lens component according to the gaze focus.

An embodiment of the present disclosure provides a head-mounted display device including: a display screen; a lens component, located on a light exiting side of the display screen; a processor; memory, including one or more computer program modules. The one or more computer program modules are stored in the memory and configured to be executed by the processor, the one or more computer program modules include instructions for performing the control method as mentioned above.

An embodiment of the present disclosure provides a computer-readable storage medium, having an executable code stored thereon, that, when executed by a processor, causes the processor to perform the control method as mentioned above.

BRIEF DESCRIPTION OF DRAWINGS

In order to more clearly illustrate the technical solutions of the embodiments of the present disclosure, the accompanying drawings of the embodiments will be briefly introduced below, it is obvious that the accompanying drawings in the following description merely relate to some embodiments of the present disclosure, but not the limitations of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In research, the inventors of the present application found that Virtual Reality (VR) motion sickness is one of factors affecting the popularity of VR devices in people's life and work, and Vergence Accommodation Conflict (VAC) is one of the main causes of VR-induced dizziness.

Figure 1:
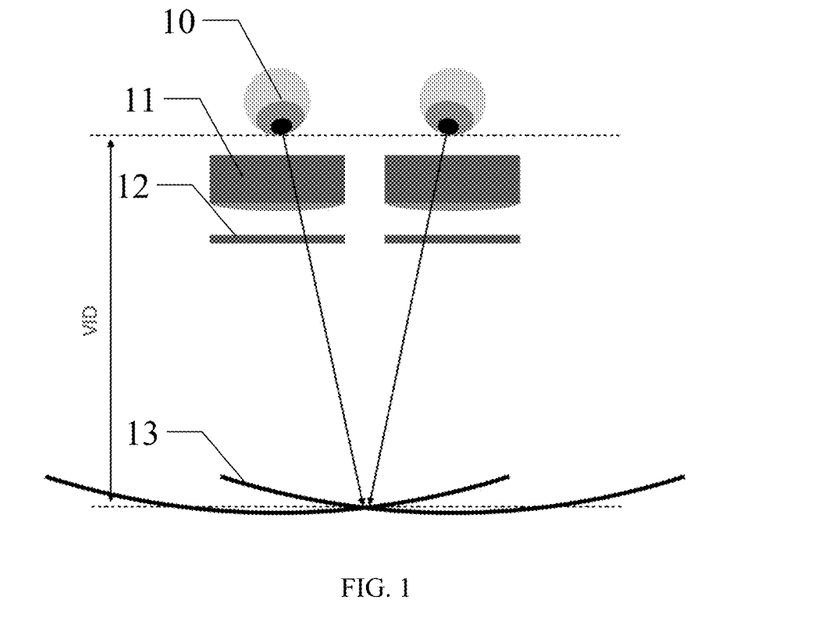
FIG. 1 is a schematic diagram that there is no vergence accommodation conflict when eyeballs of both eyes view virtual images.
Figure 2:
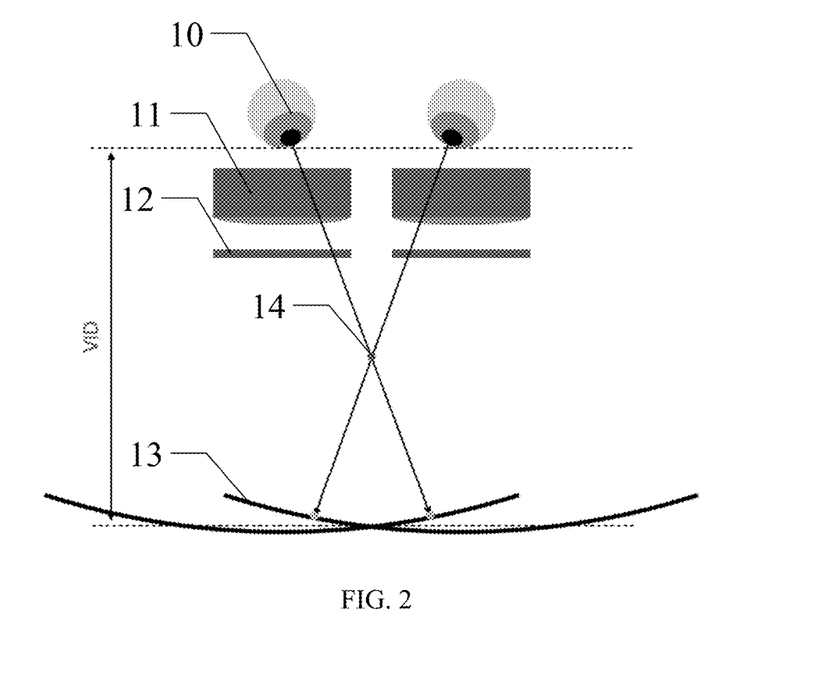
FIG. 2 is a schematic diagram of a vergence accommodation conflict when eyeballs of both eyes view virtual images.

FIG. 1 is a schematic diagram that there is no vergence accommodation conflict when eyeballs of both eyes view virtual images. FIG. 2 is a schematic diagram of a vergence accommodation conflict when eyeballs of both eyes view virtual images.

As shown in FIG. 1 and FIG. 2, the head-mounted display device includes a lens 11 and a display screen 12 through which both eyes 10 view virtual image planes 13 of the display screen 12, as a distance between the both eyes 10 and an intersection of the virtual image planes 13 may be VID. As shown in FIG. 1, when a gaze focus of the both eyes 10 is located at the intersection of the two virtual image planes 13, no vergence accommodation conflict occurs, and the user watches the image in the head-mounted display device the same as in real life, and is less likely to cause dizziness. As shown in FIG. 2, when the gaze focus 14 of the both eyes 10 is not located at the intersection of the two virtual image planes 13, the vergence accommodation conflict occurs, which easily causes a feeling of dizziness to the user.

Embodiments of the present disclosure provide a head-mounted display device and a control method thereof, and a computer-readable storage medium.

A head-mounted display device provided by an embodiment of the present disclosure includes a display screen and a lens component, a control method of the head-mounted display device includes: determining gaze directions of both eyes of a user; determining a gaze focus according to the gaze directions of the both eyes; adjusting positions of the display screen and the lens component according to the gaze focus, so that the gaze focus is located at an image plane position of a virtual image formed by the lens component from an image displayed by the display screen.

The control method of the head-mounted display device provided by the present disclosure can alleviate vergence accommodation conflict by adjusting the relative positions of the display screen and the lens component so that the gaze focus is located at the image plane position of the virtual image, and advantageously alleviate the feeling of dizziness generated by the user when using the head-mounted display device.

The head-mounted display device provided by an embodiment of the present disclosure includes: a housing, two display assemblies, an eye tracker and a controller located within the housing. The two display assemblies respectively correspond to eyeballs of both eyes of a user, and each display assembly includes at least one display screen and at least one lens component located at a light exiting side of the at least one display screen; the eye tracker is configured to determine gaze directions of the both eyes of the user and determine a gaze focus of the both eyes according to the gaze directions of both eyes; the controller is electrically connected with the two display assemblies and the eye tracker. The two display assemblies are configured to be movable with respect to the housing, and the controller is configured to adjust positions of the display screen and the lens component according to the gaze focus so that the gaze focus is located at an image plane position of a virtual image formed by the lens component from an image displayed by the display screen.

In the head-mounted display device provided by the present disclosure, by disposing the display assembly movable with respect to the housing to adjust the positions of the display screen and the lens component with respect to the eyeballs of both eyes, and/or to adjust the relative position of the display screen and the lens component, according to the gaze focus, so that the gaze focus is located at the intersection of the two virtual image planes formed by the two display assemblies, so as to alleviate vergence accommodation conflict, and advantageously alleviate the feeling of dizziness generated by the user when using the head-mounted display device.

The head-mounted display device and the control method thereof, and the computer-readable storage medium by the embodiments of the present disclosure are described below with reference to the drawings.

Figure 3:
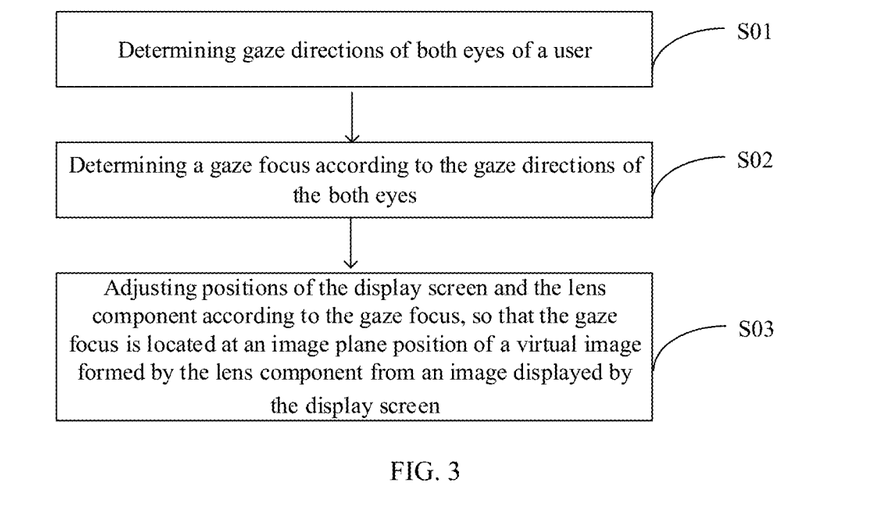
FIG. 3 is a control method of a head-mounted display device provided according to an embodiment of the present disclosure.

FIG. 3 is a control method of a head-mounted display device provided according to an embodiment of the present disclosure. As shown in FIG. 3, the head-mounted display device adopting the control method provided by the present disclosure includes a display screen and a lens component, the control method includes the following steps, S01: determining gaze directions of both eyes of a user; S02: determining a gaze focus according to the gaze directions of the both eyes; and S03: adjusting positions of the display screen and the lens component according to the gaze focus, so that the gaze focus is located at an image plane position of a virtual image formed by the lens component from an image displayed by the display screen.

According to the control method of the head-mounted display device provided by the present disclosure, by adjusting the positions of the display screen and the lens component with respect to the eyeballs of both eyes, and/or adjusting the relative position of the display screen and the lens component, so that the gaze focus is located at the image plane position of the virtual image, the vergence accommodation conflict can be alleviated, which is beneficial to alleviate the feeling of dizziness generated by the user when using the head-mounted display device.

Figure 4:
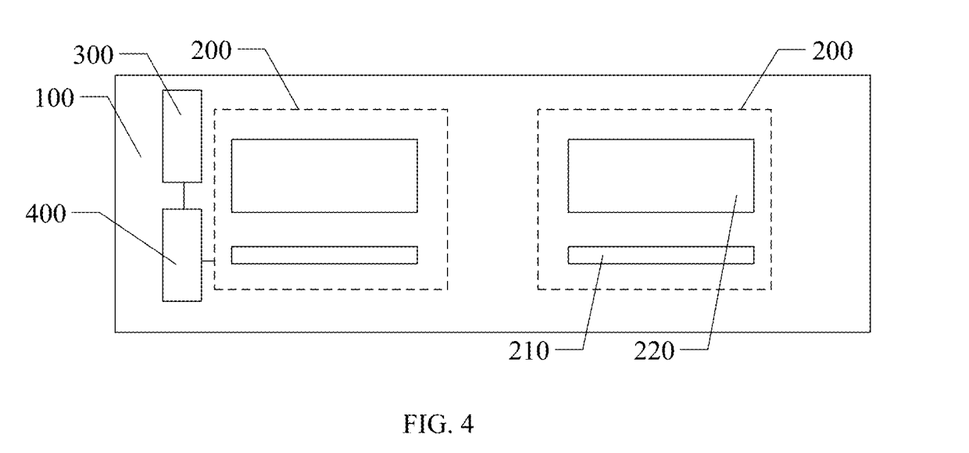
FIG. 4 is a partial structural schematic diagram of a head-mounted display device provided according to an embodiment of the present disclosure.

FIG. 4 is a partial structural schematic diagram of a head-mounted display device provided according to an embodiment of the present disclosure. As shown in FIG. 4, the head-mounted display device includes a housing 100, two display assemblies 200 located within the housing 100, an eye tracker 300, and a controller 400. The two display assemblies 200 respectively correspond to eyeballs of the both eyes of the user, and each display assembly 200 includes at least one display screen 210 and at least one lens component 220, the at least one lens component 220 is located at a light exiting side of the at least one display screen 210. The eye tracker 300 is configured to determine a gaze direction of both eyes of the user, and determine a gaze focus of both eyes according to the gaze directions of both eyes. The controller 400 is electrically connected with the two display assemblies 200 and the eye tracker 300. The two display assemblies 200 are configured to be movable with respect to the housing 100, and the controller 400 is configured to adjust the positions of the display screen 210 and the lens component 220 according to the gaze focus so that the gaze focus is located at an image plane position of a virtual image imaged by an image displayed by the display screen 210 through the lens component 220.

For example, the head-mounted display device provided by the embodiment of the present disclosure may be a head-mounted display device to which the control method shown in FIG. 3 is applied.

For the optical design in the head-mounted display device, moving the lens component with respect to the user's eyes, or changing the distance between the display screen and the lens component, causes the image plane of the virtual image, i.e., the virtual image plane (VIP), to change.

According to the head-mounted display device provided by the present disclosure, by disposing the display assembly movable with respect to the housing to adjust the positions of the display screen and the lens component with respect to the eyeball of both eyes according to the gaze focus, and/or to adjust the relative position of the display screen and the lens component according to the gaze focus, so that the gaze focus is located at the intersection of the two virtual image planes formed by the two display assemblies, vergence accommodation conflict can be alleviate, so as to advantageously alleviate the feeling of dizziness generated by the user when using the head-mounted display device.

For example, as shown in FIGS. 3 and 4, in step S01, the eye tracker 300 may be employed to determine the gaze directions of the both eyes of the user. For example, the eye tracker 300 is employed to track the position of both eyes of the user.

For example, as shown in FIGS. 3 and 4, in step S02, according to the gaze directions of the both eyes, the eye tracker 300 may be employed to determine the gaze focus of the both eyes. For example, the eye tracker 300 may be used to calculate the gaze focus of both eyes based on the position of the eyeballs of both eyes.

The control method as well as the head-mounted display device provided by the embodiments of the present disclosure apply eye tracking technology.

For example, as shown in FIG. 4, the head-mounted display device includes a near-eye display device, which may be a wearable Virtual Reality (VR) helmet, VR glasses, or the like, to which embodiments of the present disclosure are not limited.

For example, as shown in FIG. 4, the eye tracker 300 may include a portion between the eye and the display assembly 200 to track the eyeball.

For example, the eye tracker 300 may employ gaze tracking techniques, such as 2D gaze tracking technique or 3D gaze tracking technique. For example, the 2D gaze tracking technique is represented by the pupil-corneal reflex method, which characterizes the gaze direction by the vector including the pupil center and the corneal brightness spot; the 3D gaze tracking technology obtains coordinates of various reference points in a 3D space by dual or multiple cameras to perform eye tracking.

For example, the eye tracker 300 may include an image acquisition unit and an image processing unit. For example, in an example of an embodiment of the present disclosure, the image acquisition unit is configured to acquire binocular iris images, and the image processing unit is configured to process the obtained iris images to establish a 3D model of the binocular iris, and to locate the gaze focus of both eyes according to the 3D model. For example, in another example of the embodiment of the present disclosure, the image acquisition unit is configured to acquire a light spot formed by reflecting red light from both eyes of the user, the image processing unit is configured to perform gaze estimation on the light spot in the acquired infrared image to determine the gaze focus. For example, in still another example of the embodiment of the present disclosure, the image acquisition unit is configured to acquire infrared light rays reflected by the eyeballs of both eyes to form an eye image, and the image processing unit acquires the eye image and the preset eye parameter information to determine the gaze focus information of both eyes.

For example, the image acquisition unit may include a camera, which may be a color camera or an infrared camera. For example, the eye tracker 300 may include multiple cameras to illuminate the eyeballs of both eyes from different angles. For example, the image processing unit may employ a high-speed calculation module such as a Digital Signal Processing (DSP) or a Field Programmable Gate Array (FPGA) for image processing.

For example, as illustrated in FIGS. 3 and 4, the eye tracker 300 transmits the above-described gaze focus information to the controller 400.

For example, as shown in FIGS. 3 and 4, in step S03, when the gaze focus of both eyes of the user is located at a position other than the image plane 13 of the virtual image of the display screen 210 through the lens component 220 (as shown in FIG. 2), the controller 400 is configured to adjust the positions of the display screen 210 and the lens component 220 according to the gaze focus so that the gaze focus is located at the position of the image plane of the virtual image of the image displayed by the display screen 210 through the lens component 220. For example, the controller 400 is configured to adjust the positions of the display screen 210 and the lens component 220 with respect to the eyeballs of the both eyes according to the gaze focus, and/or the controller 400 is configured to adjust the relative position of the display screen 210 and the lens component 220 according to the gaze focus to make the gaze focus be located at the image plane position of the virtual image.

For example, a linear motor, a piezoelectric ceramic, or the like structure may be further included in the head-mounted display device, and the controller drives at least one of the display screen and the lens component to move relative to the eyes by controlling the linear motor, the piezoelectric ceramic, or the like structure.

For example, the controller may refer to implementing a control function in hardware, i.e., a person skilled in the art may construct corresponding hardware circuitry to implement a control function without regard to cost. For example, a hardware circuit includes a conventional very large scale integration (VLSI) circuit or gate array as well as existing semiconductors such as logic chips, transistors, or other discrete elements. For example, the controller may also be implemented in a programmable hardware device such as a field programmable gate array, programmable array logic, programmable logic device, or the like, as the present embodiments are not limited in this respect.

For example, the controller may also refer to implementing control functions with software algorithms for execution by various types of processors. For example, the controller may be a module implemented in a software algorithm in view of the level of existing hardware technology.

In some examples, as shown in FIG. 4, the head-mounted display device includes two display assemblies 200 corresponding to eyeballs of the both eyes, respectively, and each display assembly 200 includes at least one display screen 210 and at least one lens component 220 located on a light-exiting side of the at least one display screen 210. FIG. 4 schematically shows that each display assembly includes one display screen and one lens component provided in correspondence with the display screen, but is not limited thereto, each display assembly may also include two or more number of display screens, and one or more lens components may be provided on the light exiting side of each display screen.

For example, as shown in FIG. 4, the lens component 220 may include one or more lenses, and when the lens component 220 includes a plurality of lenses, the plurality of lenses may include a combination of at least one convex lens and at least one concave lens.

For example, as shown in FIG. 4, the display screen 210 may be a micro-display screen having, for example, a diagonal dimension of typically 0.39 inches, 2.1 inches, or 2.54 inches; for example, the display screen 210 may be a large size display screen as well, and which is not limited thereto. For example, the display screen 210 may be any type of display screen such as a liquid crystal display screen, an organic light emitting diode display screen, an inorganic light emitting diode display screen, a quantum dot display screen, a projector (e.g., an LCOS micro-projector), or the like.

Figure 5:
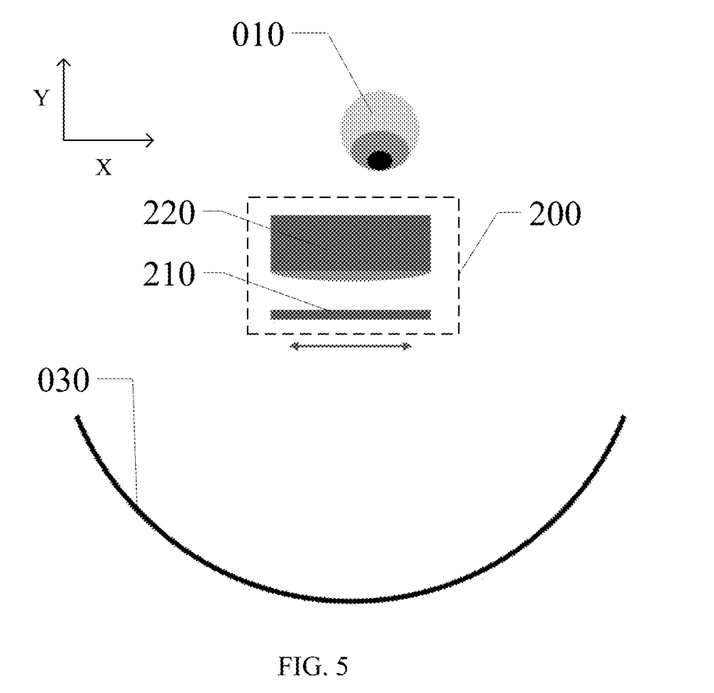
FIG. 5 and FIG. 6 are schematic diagrams of adjusting a position of a virtual image in the case of a single eye.
Figure 6:
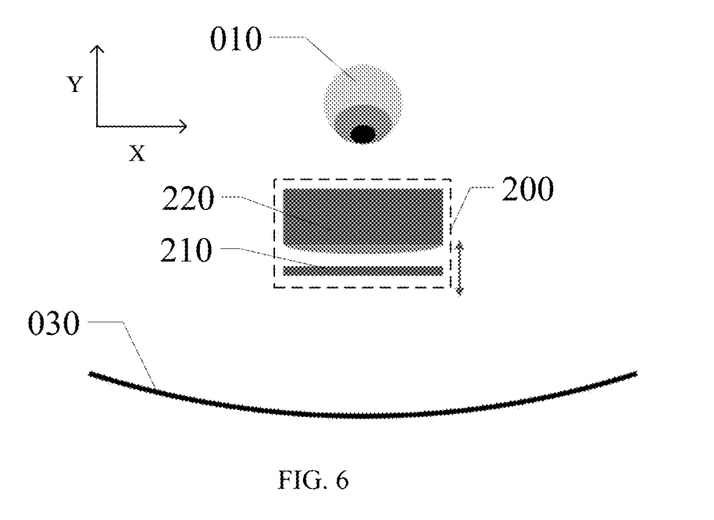

FIG. 5 and FIG. 6 are schematic diagrams of adjusting a position of a virtual image in the case of a single eye.

For example, as shown in FIG. 5, one eyeball 010 corresponds to one display assembly 200, and the position of the image plane 030 of the virtual image can be adjusted by moving the display assembly 200 in a plane perpendicular to the Y direction. For example, an optical axis of the lens component 220 may extend in the Y direction.

For example, as shown in FIGS. 4 and 5, the display assembly 200 moves relative to the housing 100 in a plane perpendicular to the Y direction. For example, the housing 100 may include a helmet, glasses, etc. headset housing. For example, the housing 100 is stationary relative to the position of the eyeball 010 and the display assembly 200 moves relative to the position of the eyeball 010.

For example, as illustrated in FIG. 6, one eyeball 010 corresponds to one display assembly 200, and the position of the image plane 030 of the virtual image can be adjusted by adjusting the relative position between the display screen 210 and the lens component 220 in the display assembly 200. For example, at least one of the display screen 210 and the lens component 220 may be moved in the Y direction to adjust the distance between the display screen 210 and the lens component 220, thereby adjusting the position of the image plane 030 of the virtual image.

For example, as shown in FIGS. 4 and 6, at least one of the display screen 210 and the lens component 220 moves in the Y direction with respect to the housing 100. For example, the lens component 220 moves in the Y direction with respect to the housing 100.

Figure 7:
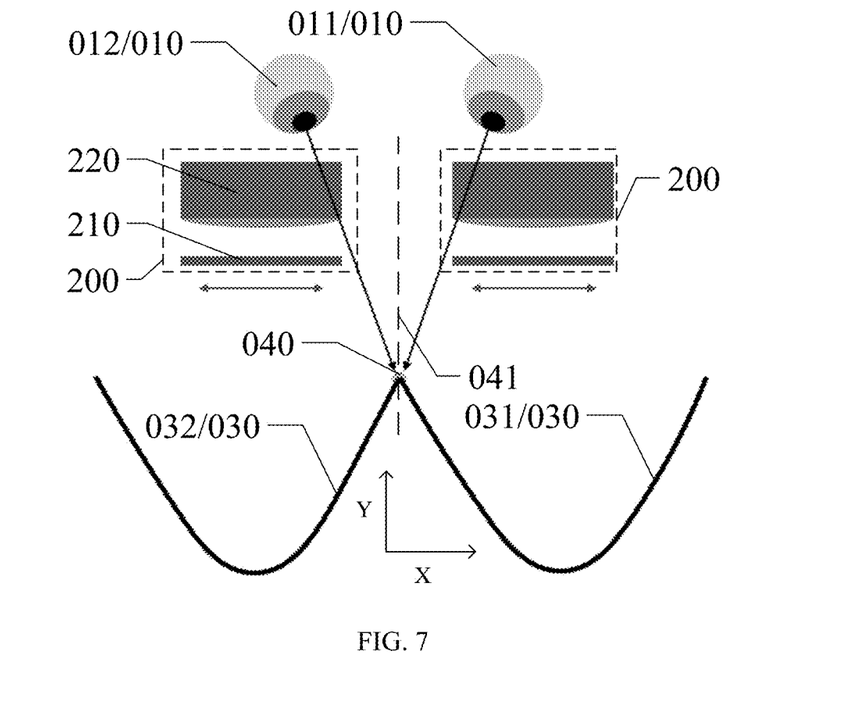
FIG. 7 and FIG. 8 are schematic diagrams of adjusting positions of a display screen and a lens component with respect to an eyeball to adjust an image plane of a virtual image according to different examples of an embodiment of the present disclosure.
Figure 8:
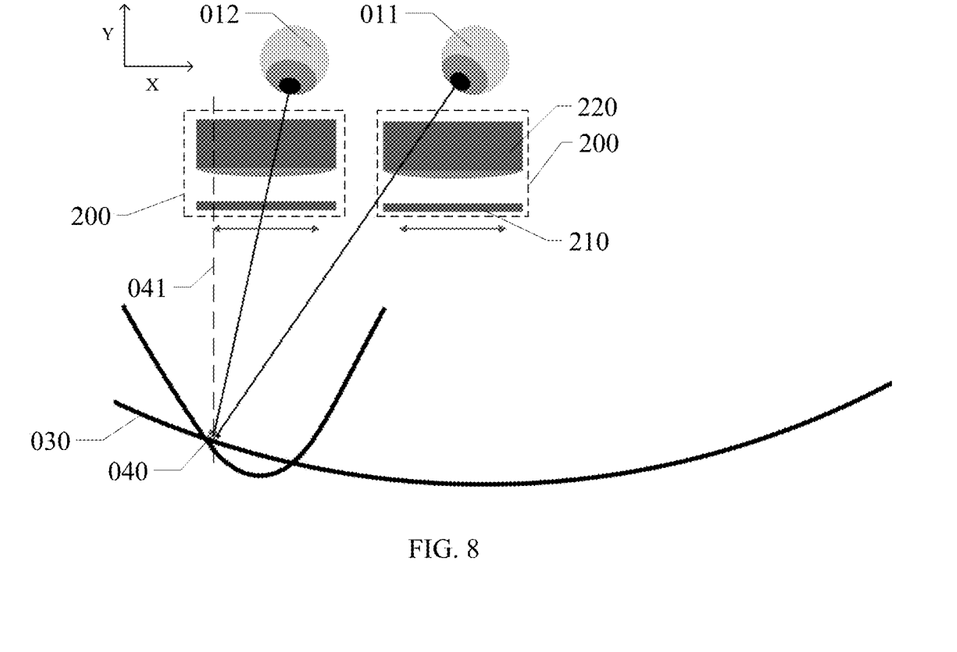

FIG. 7 and FIG. 8 are schematic diagrams of adjusting positions of a display screen and a lens component with respect to an eyeball to adjust an image plane of a virtual image according to different examples of an embodiment of the present disclosure.

In some examples, as shown in FIGS. 3-4 and 7, the control method for adjusting the positions of the display screen 210 and the lens component 220 relative to eyeballs 011 and 012 of both eyes includes driving at least one display assembly 200 to move in a plane perpendicular to the optical axis of lens component 220, such as a plane perpendicular to the Y direction, to adjust the position of at least one display assembly 200 relative to the corresponding eyeball. In the head-mounted display device to which the above control method is applied, the at least one display assembly 200 is configured to move in a plane perpendicular to the optical axis of the lens component to adjust the position of the at least one display assembly 200 with respect to the corresponding eyeball.

As shown in FIGS. 4 and 7, according to the gaze focus information of the eye tracker 300, the controller 400 may drive the at least one display assembly 200 to move in the plane perpendicular to the optical axis of the lens component 220 to adjust the position of the at least one display assembly 200 with respect to the corresponding eyeball, and may adjust the intersection of the image planes 031 and 032 of the two virtual images to the position of the gaze focus 040 of both eyeballs 011 and 012, so as to alleviate vergence accommodation conflict and facilitate solving dizziness problem.

For example, FIG. 7 schematically shows the display assembly 200 moving in the X direction, but is not limited thereto, and the display assembly may also move in other directions in a plane perpendicular to the Y direction.

For example, as shown in FIG. 7, the controller may adjust the two display assemblies 200 to simultaneously move in the above-described plane to adjust the image planes 031 and 032 of the two virtual images at the same time to adjust the intersection of the two image planes to the position of the gaze focus 040 of both eyeballs 011 and 012.

For example, when the gaze focus 14 of both eyes of the user is located at a position other than the image plane 13 of the virtual image as shown in FIG. 2, the controller 400 is configured to adjust the movement of the display assembly 200 in a plane perpendicular to the optical axis of the lens component 220 to adjust the image planes 031 and 032 of the virtual image according to the gaze focus, such that the gaze focus 040 is located at a position of the image plane of the virtual image of the image displayed by the display screen 210 through the lens component 220, such as a position of the intersection of the image planes 031 and 032 of the virtual image, as shown in FIG. 7, so that the diopters of each eyeball are accommodated at the vergence accommodation point to alleviate vergence accommodation conflict and facilitate dizziness to achieve optimal display.

In some examples, as shown in FIG. 7, the control method for adjusting the positions of the display screen 210 and the lens component 220 with respect to both eyeballs 011 and 012 includes driving the two display assemblies 200 to undergo symmetrical movement in a plane with respect to a midpoint of a line connecting the both eyeballs 011 and 012 in the case where a line 041 passing through the gaze focus 040 and parallel to the direction of the optical axis passes through a region between the two display assemblies 200. As shown in FIG. 7, in the head-mounted display device to which the above control method is applied, the two display assemblies 200 are configured to perform symmetrical movements in a plane with respect to the midpoint of the line connecting both eyeballs 011 and 012 according to the position of the gaze focus 040, to achieve an optimal display effect when both eyes are in frontal state.

For example, as shown in FIG. 7, the two display assemblies 200 may both move closer to the line 041, both move away from the line 041, both move upward, or both move downward. As used herein, "upward" and "downward" refer to directions perpendicular to the plane of the paper and opposite directions.

For example, as shown in FIG. 7, both display assemblies 200 may move the same distance. For example, during movement of the two display assemblies 200, the distance between the center of each display assembly 200 and the corresponding eyeball is approximately equal.

For example, as shown in FIG. 7, a midpoint of a line connecting centers of the two display assemblies 200 is a first midpoint, the midpoint of the line connecting the eyeballs 011 and 012 of the user's eyes is a second midpoint, and a line connecting the first midpoint and the second midpoint is substantially perpendicular to the X direction throughout the movement of the two display assemblies 200.

The above-mentioned "a line 041 passing through the gaze focus 040 and parallel to the direction of the optical axis passes through the region between the two display assemblies 200" means that both eyeballs 011 and 012 are in a frontal state, such as looking substantially straight ahead, rather than strabismus.

The above-mentioned "symmetrical movement" means that the two display assemblies 200 are simultaneously moved in the plane perpendicular to the Y direction, and that the center line in the plane and perpendicular to the XY-plane is an initial symmetry axis, which is the center line of the two display assemblies 200 when the two display assemblies 200 are in the initial position, and that the two display assemblies 200 are constantly symmetrically distributed with respect to the initial symmetry axis during the movement in the plane. The initial position may refer to a position at which the display assembly is set when the head-mounted display device is produced.

The line through the gaze focus may be a line through the initial symmetry axis, or a distance between the line through the gaze focus and the initial symmetry axis may be less than 10% of an initial distance between the two display assemblies. The initial distance may refer to a distance between the two display assemblies when the head-mounted display device is produced.

In some examples, as shown in FIG. 8, the control method for adjusting the positions of the display screen 210 and the lens component 220 with respect to eyeballs 011 and 012 includes driving the two display assemblies 200 to move asymmetrically in a plane with respect to a midpoint of a line connecting the eyeballs 011 and 012 when a line 041 passing through the gaze focus 040 and parallel to the direction of the optical axis passes through one display assembly 200. As shown in FIG. 8, in the head-mounted display device to which the above control method is applied, the two display assemblies 200 are configured to perform asymmetrical movements in a plane with respect to the midpoint of the line connecting both eyeballs 011 and 012 according to the position of the gaze focus 040, so as to achieve an optimal display effect when both eyes are in strabismus state.

The above-mentioned "a line 041 passing through the gaze focus 040 and parallel to the direction of the optical axis passes through one display assembly 200" means that at least one of the eyeballs 011 and 012 is in a strabismus state, e.g., not substantially looking straight ahead.

The above-mentioned "asymmetrical movement" means that the two display assemblies 200 are moved simultaneously or only one of the two display assemblies is moved in a plane perpendicular to the Y direction, and that the center line in the plane and perpendicular to the XY-plane is an initial symmetry axis, which is the center line when the two display assemblies 200 are in an initial position, and that the two display assemblies 200 are not symmetrically distributed with respect to the above-mentioned initial symmetry axis during the movement in the plane. The initial position may refer to a position at which the display assembly is set when the head-mounted display device is produced.

For example, as shown in FIG. 8, the two display assemblies 200 may move different distances. For example, during movement of the display assemblies 200, the distance between the midpoint of each display assembly 200 and the corresponding eyeball varies.

For example, as shown in FIG. 8, when two display assemblies 200 simultaneously move in a plane perpendicular to the Y direction, the display assembly 200 overlapping the line 041 may move by a distance smaller than the display assembly 200 not overlapping the line 041.

For example, as shown in FIG. 8, a midpoint of a line connecting centers of the two display assemblies 200 is a first midpoint, the midpoint of the line connecting the eyeballs 011 and 012 of the user's eyes is a second midpoint, and the line connecting the first midpoint and the second midpoint is not perpendicular to the X direction during the movement of the two display assemblies 200.

Figure 9:
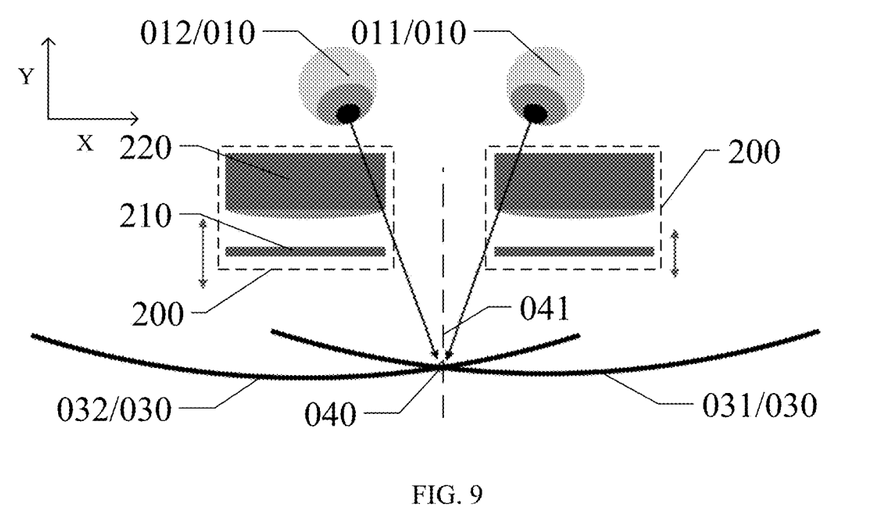
FIG. 9 and FIG. 10 are schematic diagrams of adjusting positions of a display screen and a lens component with respect to an eyeball to adjust an image plane of a virtual image according to different examples of an embodiment of the present disclosure.
Figure 10:
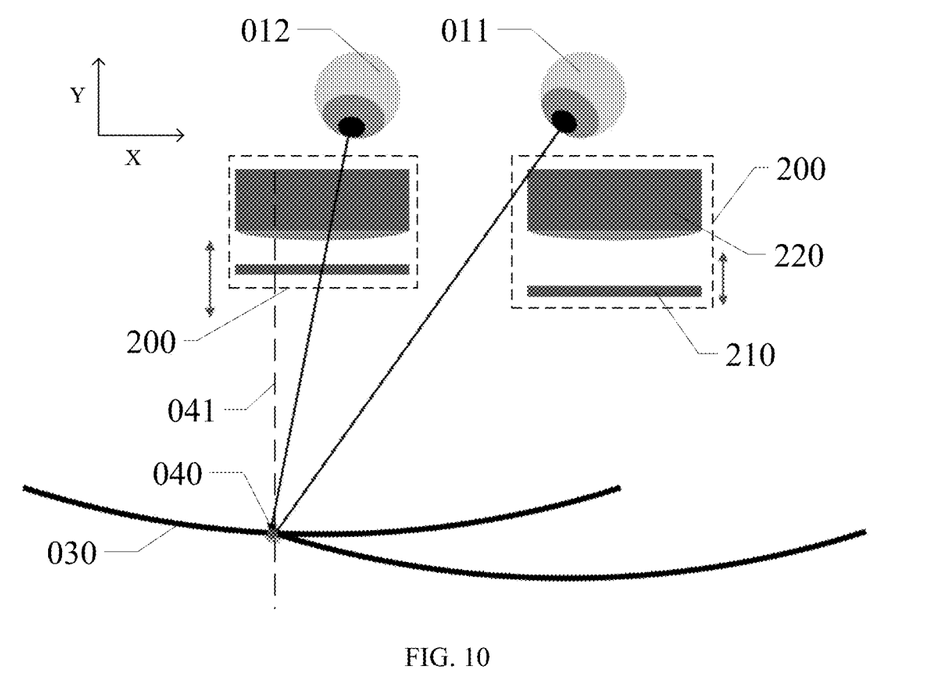

FIG. 9 and FIG. 10 are schematic diagrams of adjusting positions of a display screen and a lens component with respect to an eyeball to adjust an image plane of a virtual image according to different examples of an embodiment of the present disclosure.

In some examples, as shown in FIGS. 3-4 and 9, the control method for adjusting the relative position of the display screen 210 and the lens component 220 includes driving at least one of the display screen 210 and the lens component 220 in at least one display assembly 200 to move in a direction parallel to an optical axis of the lens component 220 to adjust a distance between the display screen 210 and the lens component 220. For example, the optical axis of the lens component 220 is parallel to the Y direction. In the head-mounted display device to which the above control method is applied, at least one of the display screen 210 and the lens component 220 in the at least one display assembly 200 is configured to move in the direction parallel to the optical axis of the lens component 220 to adjust the distance between the display screen 210 and the lens component 220.

As shown in FIGS. 4 and 9, according to the gaze focus information of the eye tracker 300, the controller 400 may drive at least one of the display screen 210 and the lens component 220 in the at least one display assembly 200 to move in the direction parallel to the optical axis of the lens component 220 to adjust the distance between the display screen 210 and the lens component 220, and may adjust the intersection of the image planes 031 and 032 of the two virtual images to a position of the gaze focus 040 of the eyeballs 011 and 012 to alleviate vergence accommodation conflict and facilitate solving the dizziness problem.

For example, as shown in FIG. 9, in the same display assembly 200, the distance of at least one of the display screen 210 and the lens component 220 with respect to the corresponding eyeball is increased or decreased.

For example, as shown in FIG. 9, the controller may adjust the structures of a same type from the two display assemblies 200 to move in the Y direction to simultaneously adjust the image planes 031 and 032 of the two virtual images to adjust the intersection of the two image planes to the position of the gaze focus 040 of both eyeballs 011 and 012. For example, the controller may adjust movement of only two display screens 210 in both display assemblies 200, or the controller may adjust movement of only two lens components 220 in both display assemblies 200, or the controller may adjust movement of both display screens 210 and lens components 220 in both display assemblies 200.

For example, when the gaze focus 14 of both eyes of the user is located at a position other than the image plane 13 of the virtual image as shown in FIG. 2, the controller 400 is configured to drive at least one of the display screen 210 and the lens component 220 in the at least one display assembly 200 to move in a direction parallel to the optical axis of the lens component 220 to adjust the position of the image planes 031 and 032 of the virtual image, such that the gaze focus 040 is located at the position of the image plane of the virtual image, such as the position of the intersection of the image planes 031 and 032 of the virtual image, as shown in FIG. 9, so that the diopter of each eye is accommodated at the vergence accommodation point to alleviate vergence accommodation conflict and facilitate solving dizziness, thereby achieving optimal display.

For example, as shown in FIG. 9, the movement of at least one of the display screen 210 and the lens component 220 in the Y direction enables the image plane of the virtual image to be moved to the position where the gaze focus 040 is located, while the display assembly 200 does not move in the plane perpendicular to the Y direction. For example, when the movement of at least one of the display screen 210 and the lens component 220 in the Y direction does not allow the image plane of the virtual image to be adjusted to the position where the gaze focus 040 is located, the display assembly 200 moves as shown in FIG. 7 or FIG. 8 in a plane perpendicular to the Y direction.

In some examples, as shown in FIG. 9, the control method for adjusting the relative position of the display screen 210 and the lens component 220 includes driving structures in a same type, in the two display assemblies 200, including at least one of the display screen 210 and the lens component 220, to move the same distance in a direction parallel to the optical axis of the lens component 220 when a line 041 passing through the gaze focus 040 and parallel to the direction of the optical axis passes through the region between the two display assemblies 200. As shown in FIG. 9, in the head-mounted display device to which the above-described control method is applied, structures of the same type from the two display assemblies 200 is configured to move the same distance in a direction parallel to the optical axis of the lens component 220 according to the position of the gaze focus 040 to achieve the optimal display effect when both eyes are in the frontal state. As described above, the structure includes at least one of the display screen 210 and the lens component 220.

The above and subsequent "structures in a same type" refers to the display screens in both display assemblies, or the lens components in both display assemblies.

For example, as illustrated in FIG. 9, the controller may adjust a first moving distance to be the same as a second moving distance so that the image planes 031 and 032 of the virtual image are adjusted to the position where the gaze focus 040 is located. For example, the first moving distance is a distance that the lens component 220 in one display assembly 200 moves in the Y direction, and the second moving distance is a distance that the lens component 220 in the other display assembly 200 moves in the Y direction. For example, the controller may adjust a third moving distance to be the same as a fourth moving distance; for example, the third moving distance is a distance that the display screen 210 in one display assembly 200 moves in the Y direction, and the fourth moving distance is a distance that the display screen 210 in the other display assembly 200 moves in the Y direction. For example, the controller may adjust a first distance difference to be the same as a second distance difference; for example, the first distance difference is a distance difference by which the display screen 210 and the lens component 220 in one display assembly 200 move in the Y direction, the second distance difference is a distance difference by which the display screen 210 and the lens component 220 in the other display assembly 200 move in the Y direction.

For example, as shown in FIG. 9, during movement of the structures in the same type in both display assemblies 200, the distance between the structure moved by each display assembly 200 and the corresponding eyeball is approximately equal.

For example, as shown in FIG. 9, a midpoint of a line connecting centers of the two display assemblies 200 is a first midpoint, the midpoint of the line connecting the eyeballs 011 and 012 of the user's eyes is a second midpoint, and a line connecting the first midpoint and the second midpoint is substantially perpendicular to the X direction throughout the movement of the structures of the same type from the two display assemblies 200.

The above-mentioned "a line 041 passing through the gaze focus 040 and parallel to the direction of the optical axis passes through the region between the two display assemblies 200" means that both eyeballs 011 and 012 are in a frontal state, such as looking substantially straight ahead, rather than strabismus.

The line through the gaze focus may be a line through an initial symmetry axis, or a distance between the line through the gaze focus and the initial symmetry axis may be less than 10% of an initial distance between the two display assemblies. The initial distance may refer to a distance between the two display assemblies when the head-mounted display device is produced.

In some examples, as shown in FIG. 10, the control method for adjusting the relative position of the display screen 210 and the lens component 220 includes driving the structures in the same type, in the two display assemblies 200, including at least one of the display screen 210 and the lens component 220 to move by different distances in a direction parallel to the optical axis of the lens component 220 when a line 041 passing through the gaze focus 040 and parallel to the direction of the optical axis passes through one display assembly 200. As shown in FIG. 10, in the head-mounted display device to which the above control method is applied, the structures of the same type from the two display assemblies 200 are configured to move in a direction parallel to the optical axis of the lens component 220 by different distances according to the position of the gaze focus 040 to achieve the optimal display effect when both eyes are in a strabismus state. As described above, the structure includes at least one of the display screen 210 and the lens component 220.

The above-mentioned "a line 041 passing through the gaze focus 040 and parallel to the direction of the optical axis passes through one display assembly 200" means that at least one of the eyeballs 011 and 012 is in a strabismus state, e.g., not substantially looking straight ahead.

For example, as illustrated in FIG. 10, the controller may adjust a first moving distance to be different from a second moving distance to adjust the image planes 031 and 032 of the virtual image to the position at which the gaze focus 040 is located. For example, the first moving distance is a distance that the lens component 220 in one display assembly 200 moves in the Y direction, and the second moving distance is a distance that the lens component 220 in the other display assembly 200 moves in the Y direction. For example, the controller may adjust a third moving distance to be different from a fourth moving distance, such as the third moving distance is a distance that the display screen 210 in one display assembly 200 moves in the Y direction, and the fourth moving distance is a distance that the display screen 210 in the other display assembly 200 moves in the Y direction. For example, the controller may adjust a first distance difference to be different from a second distance difference; for example, the first distance difference is a distance difference by which the display screen 210 and the lens component 220 in one display assembly 200 move in the Y direction, the second distance difference is a distance difference by which the display screen 210 and the lens component 220 in the other display assembly 200 move in the Y direction.

For example, as shown in FIG. 10, during movement of the display assemblies 200, the distance between the midpoint of the moving structure in each display assembly 200 and the corresponding eyeball varies.

For example, as shown in FIG. 10, the structures in the same type that move in the display assembly 200 may each be a lens component 220.

For example, as shown in FIG. 10, when the structures in the same type in both display assemblies 200 move in the Y direction at the same time, the structure in the display assembly 200 overlapping with the line 041 may move a smaller distance than the structure in the display assembly 200 not overlapping with the line 041.

In some examples, as shown in FIG. 10, the control method of adjusting the relative position of the display screen 210 and the lens component 220 includes driving at least one of the display screen 210 and the lens component 220 in only one display assembly 200 to move in a direction parallel to the optical axis of the lens component 220 when a line 041 passing through the gaze focus 040 and parallel to the direction of the optical axis passes through the one display assembly 200. As shown in FIG. 10, in the head-mounted display device to which the above-described control method is applied, the structure in only one of the two display assemblies 200 is configured to move in the direction parallel to the optical axis of the lens component 220 to achieve an optimal strabismus. The structure in the only one display assembly 200 described above includes at least one of the display screen 210 and the lens component 220.

For example, as shown in FIG. 10, when both eyeballs 011 and 012 of the user are in the strabismus state, only structures in the display assembly 200 that do not overlap with the line 041 may move in the Y direction or only structures in the display assembly 200 that overlap with the line 041 may move in the Y direction. The above structure includes at least one of the display screen 210 and the lens component 220.

For example, as shown in FIG. 10, when at least one of the display screen 210 and the lens component 220 is moved in the Y direction so that the image plane of the virtual image is located at the position of the gaze focus 040, the display assembly 200 does not move in the plane perpendicular to the Y direction. For example, when the movement of at least one of the display screen 210 and the lens component 220 in the Y direction still cannot adjust the image plane of the virtual image to the position where the gaze focus 040 is located, the display assembly 200 performs the movement as shown in FIG. 7 or FIG. 8 in the plane perpendicular to the Y direction.

In some examples, as shown in FIGS. 3 to 10, the control method further includes adjusting the positions of the display screen 210 and the lens component 220 with respect to the eyeballs 011 and 012, and/or adjusting a movement time of the relative position of the display screen 210 and the lens component 220 within 100 milliseconds after a blink or an eye jump of the both eyes of the user, so that the structure in which the movement occurs has a fast reaction time and stability, avoiding the user's perception, thereby achieving the best experience effect.

For example, as illustrated in FIGS. 3 to 10, the movement time of adjusting the relative position of the display screen 210 and the lens component 220 is within 50 milliseconds (non-sensitive time) after a blink or an eye jump of the both eyes of the user. For example, the movement time of adjusting the display screen 210 and the lens component 220 is within 30 milliseconds after a blink or an eye jump of the both eyes of the user. For example, the movement time of adjusting the display screen 210 and the lens component 220 is within 20 milliseconds after a blink or an eye jump of the both eyes of the user.

In some examples, as illustrated in FIGS. 3 to 10, after adjusting the gaze focus 040 to be located at the image plane position of the virtual image, the control method further includes: adjusting the display content in the display screen 210 to optimize an aberration of the virtual image. For example, the above-mentioned aberration includes distortion. For example, when the display screen 210 and the lens component 220 are driven to move, distortion needs to be adjusted according to the positions of the lens component 220, the display screen 210, and the eyeball, so as to avoid additional dizziness caused by the pupil drift caused by the movement.

For example, in optically designing the display assembly in the head-mounted display device provided by the present disclosure, the virtual image plane may have high sensitivity with respect to movement of the display screen or the lens component, such as when the display screen or the lens component is moved by a small distance, the virtual image plane may be moved by a large distance, thereby minimizing the distance of movement of the lens component or the display screen, increasing reaction speed, reducing reaction time, and physical interference.

Figure 11:
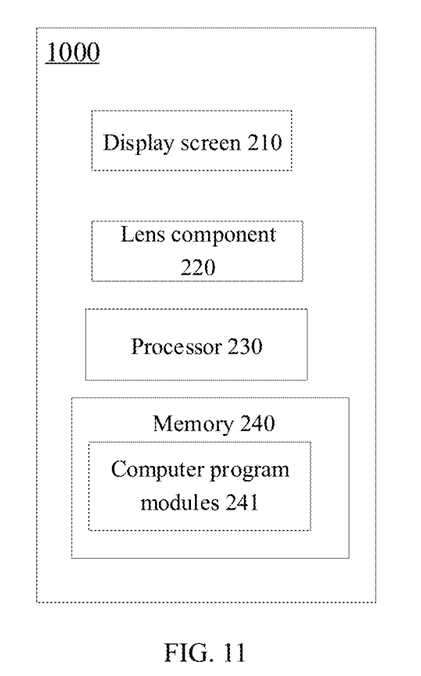
FIG. 11 is a schematic block diagram of a head-mounted display device according to at least one embodiment of the present disclosure.

FIG. 11 is a schematic block diagram of a head-mounted display device according to at least one embodiment of the present disclosure.

As shown in FIG. 11, an embodiment of the present disclosure further provides a head-mounted display device including a display screen 210 and a lens component 220 located on a light exiting side of the display screen 210. The display screen and the lens component in this embodiment may have the same features as those provided in any of the above embodiments, and will not be described in detail herein.

As shown in FIG. 11, the head-mounted display device further includes a processor 230 and a memory 240 including one or more computer program modules 241. One or more computer program modules are stored in the memory 240 and configured to be executed by the processor 230, the one or more computer program modules including instructions for performing the control method as described above. For example, the memory and processor may include at least part of the eye tracker as well as the controller in the embodiments described above.

For example, the processor 230 may be a central processing unit (CPU), a digital signal processor (DSP), or other form of processing unit having a data processing capability and/or a program executing capability, such as a field programmable gate array (FPGA) or the like; for example, the central processing unit (CPU) may be an X86 or ARM architecture or the like. The processor 230 may be a general-purpose processor or a special-purpose processor, and may perform desired functions with other components in the head-mounted display device 1000.

For example, the memory 240 may include any combination of one or more computer program products that may include various forms of computer-readable storage medium, such as volatile memory and/or non-volatile memory. Volatile memory may include, for example, random access memory (RAM), cache memory, and/or the like. The non-volatile memory may include, for example, a read-only memory (ROM), a hard disk, an erasable programmable read-only memory (EPROM), a portable compact disc read-only memory (CD-ROM), a USB memory, a flash memory, or the like. On the computer-readable storage medium may be stored one or more computer program modules 241, which the processor 230 may run, to implement various functions of the head-mounted display device 1000. Also stored in the computer-readable storage medium may be various applications and various data as well as various data used and/or generated by the applications, and the like. Specific functions and technical effects of the head-mounted display device 1000 may be referred to the descriptions hereinabove regarding the control method, which are not repeated here.

Figure 12:
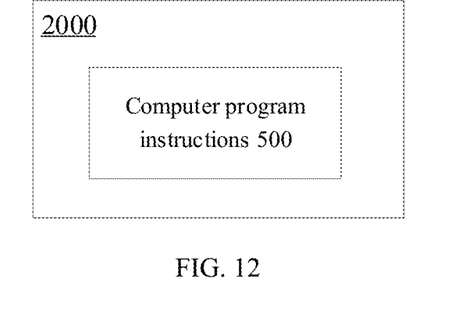
FIG. 12 is a schematic block diagram of a computer-readable storage medium according to at least one embodiment of the present disclosure.

FIG. 12 is a schematic block diagram of a computer-readable storage medium according to at least one embodiment of the present disclosure.

Embodiments of the present disclosure also provide a computer-readable storage medium. As shown in FIG. 12, a computer-readable storage medium 2000 has stored thereon computer program instructions 500 that, when executed by a processor, perform one or more steps of the control method as described above.

For example, the computer-readable storage medium 2000 may be any combination of one or more computer-readable storage medium, such as one computer-readable storage medium containing computer-readable program code for determining the gaze direction of both eyes of a user, another computer-readable storage medium containing computer-readable program code for calculating the gaze focus of both eyes based on the position of eyeballs of the both eyes, and yet another computer-readable storage medium containing computer-readable program code for adjusting the positions of the display screen and lens component relative to the eyeballs of the both eyes, and/or the relative position of the display screen and lens component, based on the gaze focus.

Of course, the aforementioned respective program codes may also be stored in the same computer-readable medium, and the embodiments of the present disclosure do not limit this. For example, when the program code is read by a computer, the computer may execute the program code stored in the computer storage medium, performing, for example, the control method provided by any one of the embodiments of the present disclosure.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disc read-only memory (CD-ROM), a flash memory, or any combination thereof, among other suitable storage mediums.

The following statements should be noted:
(1) In the accompanying drawings of the embodiments of the present disclosure, the drawings involve only the structure(s) in connection with the embodiment(s) of the present disclosure, and other structure(s) can be referred to common design(s).
(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. A control method of a head-mounted display device, wherein the head-mounted display device comprises a display screen and a lens component, the control method comprising:
   determining gaze directions of both eyes of a user;
   determining a gaze focus according to the gaze directions of the both eyes;
   adjusting positions of the display screen and the lens component according to the gaze focus, so that the gaze focus is located at an image plane position of a virtual image formed by the lens component from an image displayed by the display screen;
   the head-mounted display device comprises two display assemblies, the two display assemblies respectively correspond to eyeballs of the both eyes, and each display assembly comprises at least one display screen and at least one lens component, the at least one lens component is located at a light exiting side of the at least one display screen;
   adjusting the positions of the display screen and the lens component according to the gaze focus comprises adjusting the positions of the display screen and the lens component with respect to eyeballs of the both eyes according to the gaze focus, which comprises:
   driving at least one display assembly to move in a plane to adjust a position of the at least one display assembly relative to a corresponding eyeball, the plane being a plane perpendicular to an optical axis of the lens component.

2. The control method according to claim 1, wherein adjusting the positions of the display screen and the lens component according to the gaze focus comprises adjusting the positions of the display screen and the lens component with respect to eyeballs of the both eyes, and/or adjusting a relative position of the display screen and the lens component, according to the gaze focus.

3. The control method according to claim 1, wherein adjusting the positions of the display screen and the lens component with respect to the eyeballs of the both eyes comprises:
   in a case where a line passing through the gaze focus and parallel to a direction of the optical axis passes through a region between the two display assemblies, the two display assemblies are driven to move symmetrically in the plane with respect to a midpoint of a connecting line of the eyeballs of the both eyes.

4. The control method according to claim 1, wherein adjusting the positions of the display screen and the lens component with respect to the eyeballs of the both eyes comprises:
   in a case where a line passing through the gaze focus and parallel to a direction of the optical axis passes through one display assembly, driving the two display assemblies to move asymmetrically in the plane with respect to a midpoint of a connecting line of the eyeballs of the both eyes.

5. The control method according to claim 1, wherein a movement time of adjusting the positions of the display screen and the lens component is within 100 milliseconds after a blink or an eye jump of the both eyes of the user.

6. The control method according to claim 1, wherein after adjusting the gaze focus located in the image plane position of the virtual image, the control method further comprising:
   adjusting display content in the display screen to optimize an aberration of the virtual image.

7. A head-mounted display device comprising:
a display screen;
a lens component, located on a light exiting side of the display screen;
a processor;
memory, comprising one or more computer program modules;
wherein the one or more computer program modules are stored in the memory and configured to be executed by the processor, the one or more computer program modules comprise instructions for performing the control method according to claim 1.

8. A non-transitory computer-readable storage medium, having an executable code stored thereon, that, when executed by a processor, causes the processor to perform the control method according to claim 1.

9. A head-mounted display device comprising:
a housing;
two display assemblies, located in the housing, wherein the two display assemblies respectively correspond to eyeballs of both eyes of a user, and each display assembly comprises at least one display screen and at least one lens component located at a light exiting side of the at least one display screen;
an eye tracker, located in the housing, wherein the eye tracker is configured to determine gaze directions of the both eyes of the user and determine a gaze focus of the both eyes according to the gaze directions of the both eyes;
a controller, located in the housing, the controller being electrically connected with the two display assemblies and the eye tracker,
wherein the two display assemblies are configured to be movable with respect to the housing, and the controller is configured to adjust positions of the display screen and the lens component according to the gaze focus, so that the gaze focus is located at an image plane position of a virtual image formed by the lens component from an image displayed by the display screen;
at least one display assembly is configured to move in a plane to adjust a position of the at least one display assembly relative to a corresponding eyeball, and the plane is a plane perpendicular to an optical axis of the lens component.

10. The head-mounted display device according to claim 9, wherein the controller is configured to adjust the positions of the display screen and the lens component with respect to the eyeballs of the both eyes, and/or adjust a relative position of the display screen and the lens component, according to the gaze focus.

11. The head-mounted display device of claim 9, wherein the two display assemblies are configured to move symmetrically or asymmetrically in the plane with respect to a midpoint of a connecting line of the eyeballs of the both eyes.

* * * * *